US012809163B2

(12) United States Patent

DiFoggio

(10) Patent No.: US 12,809,163 B2

(45) Date of Patent: *Nov. 24, 2026

(54) OPTICAL SYSTEM AND METHOD FOR CLEANING OPTICAL WINDOWS

(71) Applicant: Baker Hughes Oilfield Operations LLC, Houston, TX (US)

(72) Inventor: Rocco DiFoggio, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 280 days.

This patent is subject to a terminal disclaimer.

(21) Appl. No.: 18/544,611

(22) Filed: Dec. 19, 2023

(65) Prior Publication Data

US 2024/0126071 A1 Apr. 18, 2024

Related U.S. Application Data

(62) Division of application No. 16/859,547, filed on Apr. 27, 2020, now Pat. No. 11,852,807.

(51) Int. Cl.

*G02B 27/00* (2006.01)

*G01V 8/20* (2006.01)

(52) U.S. Cl.

CPC ........... *G02B 27/0006* (2013.01); *G01V 8/20* (2013.01)

(58) Field of Classification Search

None

See application file for complete search history.

(56) References Cited

U.S. PATENT DOCUMENTS

| | | | |
|---|---|---|---|
| 3,178,159 A | 4/1965 | Johnson | |
| 5,166,747 A | 11/1992 | Schroeder | |
| 5,859,430 A * | 1/1999 | Mullins | E21B 47/114 250/343 |
| 6,388,251 B1 | 5/2002 | Papanyan | |
| 6,421,127 B1 | 7/2002 | McAndrew | |
| 7,783,400 B1 | 8/2010 | Zimler | |
| 8,619,256 B1 | 12/2013 | Pelletier | |
| 10,865,638 B2 | 12/2020 | Jones | |
| 11,852,807 B2 * | 12/2023 | DiFoggio | G02B 23/2492 |

(Continued)

FOREIGN PATENT DOCUMENTS

| | | |
|---|---|---|
| JP | 62225202 | 10/1987 |
| WO | 2016/044007 | 3/2016 |

OTHER PUBLICATIONS

International Search Report and Written Opinion mailed Sep. 15, 2021 in corresponding PCT Application No. PCT/US21/28670.

(Continued)

*Primary Examiner* — Marcus H Taningco

(74) *Attorney, Agent, or Firm* — Hogan Lovells Cadwalader US LLP

(57) ABSTRACT

A system for downhole optical analysis includes a housing forming at least part of a pressure barrier. The system also includes a window, formed at an end of the housing, the window being at least semi-transparent to permit light to travel through the window. The system further includes at least one light source, arranged within the housing, wherein the at least one light source is configured to emit a beam of light at a wavelength to enable non-contact, optical cleaning of the window, the wavelength being selected to reduce interaction with the window while heating a fluid film formed on the window outside the housing.

9 Claims, 10 Drawing Sheets

(56) References Cited

U.S. PATENT DOCUMENTS

| | | | | |
|---|---|---|---|---|
| 2006/0092506 | A1 | 5/2006 | Tsuchiya | |
| 2008/0165356 | A1 | 7/2008 | DiFoggio | |
| 2009/0295039 | A1 | 12/2009 | Fruth | |
| 2011/0036146 | A1 | 2/2011 | Pope | |
| 2012/0201031 | A1 | 8/2012 | Marley | |
| 2013/0016336 | A1 | 1/2013 | Xie | |
| 2016/0327683 | A1 | 11/2016 | Openfield | |
| 2017/0099700 | A1 | 4/2017 | Chae | |
| 2017/0241899 | A1 | 8/2017 | Jones | |
| 2017/0242149 | A1 | 8/2017 | Fujisawa | |
| 2017/0329044 | A1 * | 11/2017 | DiFoggio | E21B 47/113 |

OTHER PUBLICATIONS

Office Action mailed Jan. 12, 2022 in corresponding U.S. Appl. No. 16/859,547.
Office Action mailed Mar. 29, 2022 in corresponding U.S. Appl. No. 16/859,547.
Office Action mailed Aug. 19, 2022 in corresponding U.S. Appl. No. 16/859,547.
Office Action mailed Dec. 2, 2022 in corresponding U.S. Appl. No. 16/859,547.
Office Action mailed Apr. 20, 2023 in corresponding U.S. Appl. No. 16/859,547.
Notice of Allowance mailed Aug. 28, 2023 in corresponding U.S. Appl. No. 16/859,547.
Office Action mailed Aug. 21, 2023 in corresponding GB Application No. GB2216169.9.

* cited by examiner

OPTICAL SYSTEM AND METHOD FOR CLEANING OPTICAL WINDOWS

CROSS-REFERENCE TO RELATED APPLICATIONS

This application is a divisional of U.S. patent application Ser. No. 16/859,547 titled "OPTICAL SYSTEM AND METHOD FOR CLEANING OPTICAL WINDOWS," filed Apr. 27, 2020, now U.S. Pat. No. 11,852,807 issued Dec. 26, 2023, which is incorporated by reference herein in its entirety for all intents and purposes.

BACKGROUND

1. Field of Disclosure

This disclosure relates in general to oil and gas tools, and in particular, to systems and methods for downhole measurements using optical analysis tools.

2. Description of the Prior Art

In oil and gas production, various measurements may be conducted in downhole environments in order to analyze one or more properties of hydrocarbon formations. A variety of tools may be utilized, such as optical tools. Optical tools may include windows or lenses that contact a downhole fluid and may become coated by the fluid. If the fluid is not cleaned from the interface between the fluid and window, subsequent measurements may be incorrect due to absorption by the coating. Current systems may heat the window or lens, itself, or heat a coating applied to the window or lens. This changes a refractive index at the fluid-surface interface, which complicates analysis. If the coating thickness is more than a few wavelengths of light, then it is the ratio of the refractive index of the coating to that of the fluid that determines the refractive-index-mismatch reflected light intensity. However, if the coating is very thin, then the effective refractive index at the window's surface lies somewhere between the refractive index of the window and that of its coating and that effective refractive index will depend on the wavelength. Additionally, other systems may attempt to flush or otherwise clear the window or lens but these methods may take too long for many measurement operations.

SUMMARY

Applicant recognized the problems noted above herein and conceived and developed embodiments of systems and methods, according to the present disclosure, for cleaning optical windows.

In an embodiment, a system for downhole optical analysis includes a housing forming at least part of a pressure barrier. The system also includes a window, formed at an end of the housing, the window being at least semi-transparent to permit light to travel through the window. The system further includes at least one light source, arranged within the housing, wherein the at least one light source is configured to emit a beam of light at a wavelength to enable non-contact optical cleaning of the window, the wavelength of light being selected to reduce interaction with the window (low absorbance) while heating a fluid film (high absorbance) formed on the window in contact with the formation fluid.

In an embodiment, a system for determining one or more fluid properties includes a tool component adapted to be secured to a tool string for use in a downhole environment. The system also includes a sensor associated with the tool component. The sensor includes a pressure housing having a chamber and a window at an end of the pressure housing. The sensor also includes at least one light source arranged within the chamber, the light source adapted to emit a light beam at a wavelength corresponding to an optical density per micron that is greater than one for at least one wellbore fluid. The optical density per length of a material for a given wavelength is the number of factors of ten by which the intensity of light, at that wavelength, is reduced when traversing that path length. Note that one optical density (OD) per micron represents extremely high absorbance. A micron is approximately 1% of the diameter of a typical human hair. For comparison, the OD per micron of black coffee at 400 nm (violet) is about 0.00075, which is 1333 times less absorbing than one OD per micron. At 1 OD per micron, 90% of the optical energy is absorbed within the first micron of the fluid that in contact with the surface of the window, which has the added benefit of heating only a very small volume of fluid and, thereby, to enable a considerable temperature rise using very reasonable levels of optical power over a short time duration.

In an embodiment, a method for acquiring data using an optical analysis tool includes acquiring, via a detector, data corresponding to at least one property of a fluid. The method also includes determining, based at least in part on the data, a first phase of the fluid. The method further includes determining that a window, associated with the optical analysis tool, is at least partially obscured by a film, the film formed at least in part by the first phase of the fluid. The method includes emitting, via at least one light source, a beam of light at a first wavelength, the first wavelength based at least in part on the first phase of the fluid.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
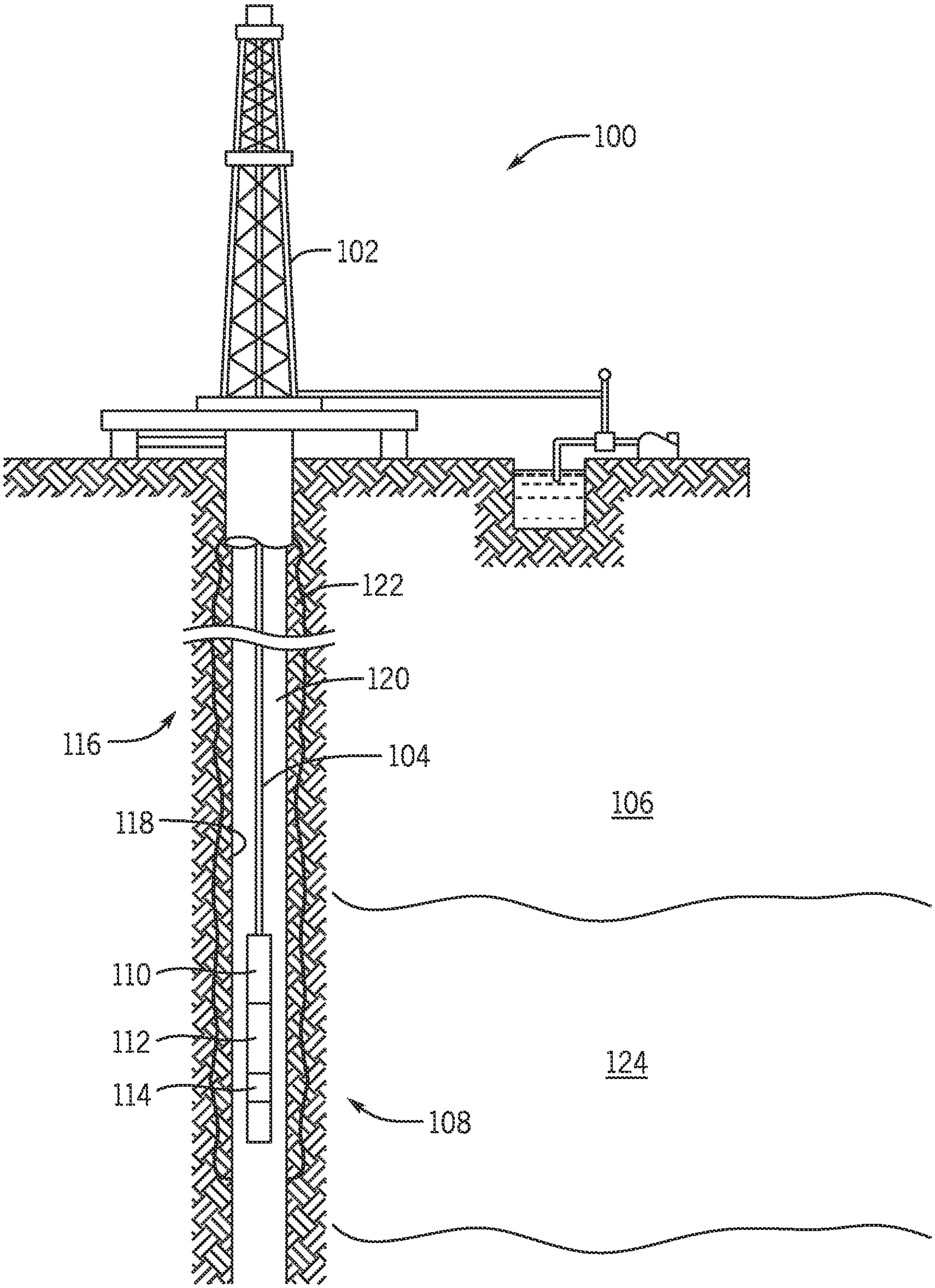
FIG. 1 is a schematic side view of an embodiment of a drilling system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Moreover, like reference numerals may be used for like items throughout the specification, however, such usage is for convenience and is not intended to limit the scope of the present disclosure.

Downhole optical components, which contact downhole fluids such oil, water, gas, and drilling mud can become coated with one fluid phase and then not clean up quickly when another fluid phase passes over them. As used herein, the fluid phase refers to a composition of the fluid (e.g., oil, water, gas, mud, combinations). Instead, there may be a thin residual film of the previous phase, which complicates determining what phase is currently passing by or analyzing that phase. Embodiments of the present disclosure selectively heat a thin layer of fluid in contact with the surface of the optical component, such as a window or conical tip, by using a flash of light at particular wavelengths, which are very strongly absorbed either by oil or by water, but which are not strongly absorbed by the optical component to be cleaned.

One optical component example that may be utilized in embodiments of this disclosure is the disk-shaped sapphire window. Certain configurations may have a clear aperture diameter of 1.9 cm corresponding to a surface area of 2.85 square cm. Such windows may be found in SampleView™ and IFX™ services provided by Baker Hughes, which measure a downhole fluid's optical absorbance, fluorescence, and refractive index (RI). Another example configuration that may utilized embodiments of the present enclosure includes immersible optical probes, such as the 300 micron base diameter by 1 mm long conical sapphire optical reflection tip (conical surface area of 0.0071 square cm), which may be used in production logging tools (such as PAI or GOWAT) for fluid identification, where the fluid phase in contact with the probe may change rapidly, and as a result the probe is desirably cleaned frequently to obtain accurate results. When there is rapid cleanup, the time average of each phase (oil, water, gas) that is detected will equal the corresponding volume fraction of that phase.

Window surface cleaning is especially important for optical reflection or fluorescence measurements, which are made at the window-fluid interface, because these measurements are dominated by whatever fluid is within a few wavelengths of light from the surface. Cleaning is less important for optical transmission measurements whenever the optical transmission path is much longer than the residual fluid coating thickness. Heating the optical surface of the window or probe tip can significantly accelerate its cleaning. One approach is to use a transparent conductive coating on the optical component surface and to heat it electrically, as described in U.S. Patent Application Publication No. 2017/0241899. In other words, prior approaches provide for contact heating of at least a portion of the window or of a solid coating adhered to the window. Prior art does not provide for direct heating of just the fluid, which is in contact with the window.

Rapid cleanup is especially important for optical measurements of the fluid, which involve reflection intensity because, at some angles, reflection intensity can be affected by optical attenuation within the small depth of penetration into the fluid by the evanescent wave, which is only a few wavelengths of the light that is used. Rapid cleanup is also important for fluorescence intensity because the depth of penetration into the fluid is limited by self-absorption of both the excitation and emission wavelengths. For example, in production logging the reflection intensity for immersed conical sapphire (RI of 1.75) tips is an indication of the fluid's refractive index, wherein gas (RI of 1.00-1.30) is the most reflecting fluid, followed by water (RI of 1.33-1.38), and, lastly, by oil (RI of 1.40-1.55), which is the least reflecting. Refractive index can be used in combination with the fluorescence intensity to distinguish rapidly all three phases, oil (fluorescing), water (non-fluorescing), and gas (non-fluorescing), which are passing by.

When the light absorption is so strong that the light can only penetrate a few wavelengths into the fluid, then the volume of fluid that is being heated becomes very small. Therefore, a flash of light, even at reasonable power levels, can dramatically raise the temperature of this volume before that absorbed heat has a chance to be conducted or radiated away. Elevated temperatures reduce the viscosity of the phase that is in contact with the optical component and also increase the mutual solubility of oil in water and vice versa, both of which effects assist with rapid cleanup.

Optical density of a particular thickness of fluid is the number of factors of ten by which light is reduced in passing through that fluid. By way of example, if a fluid's absorbance at some wavelength is 1 OD per micron, then 90% of the light energy at that wavelength will be absorbed within one micron (1e-4 cm). For SampleView™ and IFX™ tools, noted above, whose clear aperture area is 2.85 square cm, 90% of that light energy will be absorbed within a volume of 2.85e-4 cubic centimeters (cc). For other tools, such as PAI and GOWAT, the conical tip area is 7.1e-3 square cm, which is 400 times less area than IFX™ so it will heat up 400 times as much as would an IFX™ fluid film for the same amount of absorbed light. For that conical tip, 90% of that light energy will be absorbed within a volume of 7.1e-7 cc. The heat capacity of water is 1 cal/g-° C. The heat capacity of crude oil ranges from 0.36 cal/g-° C. to 0.60 cal/g-° C., with an average of 0.48 cal/g-° C., so oil's temperature will, on average, rise about twice as much as would water for the same amount of absorbed light.

Embodiments of the present disclosure provide for a rapid and non-contact optical method of cleaning optical windows using a flash of light. Unlike coating the window with a transparent conductive coating and then electrically heating it to heat the fluid near the window, this optical method does not waste energy heating the solid material that is in contact with the fluid but heats only the thin layer of fluid in contact with this solid. Furthermore, embodiments may provide a simplified configuration where a light source, which may also be a light source utilized to conduct downhole analysis, is utilized without running additional wiring for electrical heating or heat transfer components in the tool.

FIG. 1 is a schematic side view of an embodiment of a wellbore system 100 including a rig 102 and a drill string 104 extending into a downhole formation 106. It should be appreciated that while various embodiments may be discussed with reference to the illustrated wellbore system 100, other embodiments may include other wellbore systems that may include wirelines, coiled tubing, and the like. For example, various embodiments of the present disclosure may be incorporated into logging operations, product operations, measurement while drilling operations, and the like. Accordingly, discussion with reference to drill strings 104 is for illustrative purposes only. The illustrated drill string 104 is formed from a plurality of tubulars joined together, for example via threads, and extends into the formation 106 to a bottom hole assembly (BHA) 108. In the illustrated embodiment, the BHA 108 includes a plurality of segments representative of one or more measurement or operational systems. For example, the BHA 108 may include an optical analysis tool 110, a communication system 112, and a sampling system 114, among other such options. In various embodiments, the BHA 108 may include additional or fewer units, and further, may be utilized to conduct one or more downhole measurement operations. Additionally, it should be appreciated that the drill string 104 may include various other components, which have been removed for simplicity and clarification with the discussion herein. Furthermore, while embodiments may be discussed with reference to drilling operations, in other embodiments the measurements may be conducted during logging periods, intervention periods, and the like.

As illustrated in FIG. 1, in various embodiments a wellbore 116 extends into the formation 106 and includes a borehole sidewall 118 and an annulus 120 arranged between the BHA 108 and the sidewall 118. In certain embodiments, during formation of the wellbore 116, the drill string 104 may include a drill bit that is driven to rotate. In various embodiments, fluid such as drilling mud may be pumped through the drill string 104 and through the drill bit, where the drilling mud may infiltrate the formation 106 in a near-borehole zone 122. Accordingly, as will be described below, measurements obtained from various systems, such as the systems illustrated with the BHA 108, may be inaccurate because of the infiltration of drilling fluid filtrate into the native formation fluid.

In various embodiments, the BHA 108 may be utilized to determine the location of a recoverable zone 124 within the formation 106. The recoverable zone 124 may refer to a region of the formation 106 that includes recoverable hydrocarbons. It is desirable for operators to determine the presence of hydrocarbons in this region, among other potential fluids, to inform potential recovery operations. For example, in embodiments, the optical analysis tool 110 may be utilized to determine a fluid phase flowing past the tool and/or for analyzing one or more properties about the phase. For example, the optical analysis tool 110 may be utilized to identify the fluid being recovered by the sampling system 114 to determine whether the near-borehole zone 122 has been purged of drilling mud and its filtrate.

As described above, existing techniques fail to solve problems with rapid (e.g., without significant delay) cleaning of an interface between the optical analysis tool 110 and the fluid. For example, as different phases flow over the optical analysis tool 110, for example past a window, a film or coating may develop, which may lead to erroneous results. Systems and methods are directed toward a non-contact optical method for cleaning the interface to facilitate downhole optical analysis.

Figure 2:
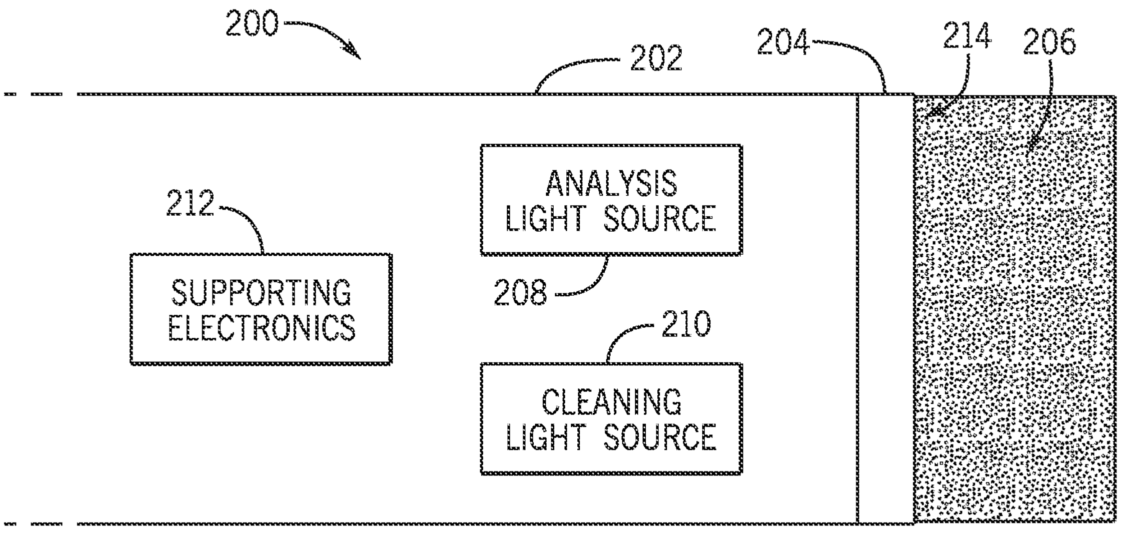
FIG. 2 is a schematic side view of an embodiment of an optical analysis tool, in accordance with embodiments of the present disclosure.

FIG. 2 is a schematic diagram of an embodiment of an optical analysis tool 200, such as a reflection-based refractometer (but it should be appreciated that embodiments are not limited to a refractometer). The illustrated optical analysis tool 200 includes a pressure housing 202. The pressure housing 202 may be particularly selected for the temperature and pressure of the downhole environment, as well as for the size of the components positioned therein. In various embodiments, a size of the pressure housing 202 may correspond to a size of a window 204 forming at least a portion of the pressure housing 202. The window 204 may be formed from a transparent or semi-transparent material to facilitate interaction with a fluid 206 flowing past the optical analysis tool 200. By way of example only, the window 204 may be formed from sapphire, but it should be appreciated that other materials may also be used. In the illustrated embodiment, the window 204 may have a surface area of approximately 2.85 square cm. As noted above, the window 204 is one example and that other tools may include a conical tip or any other reasonable shape. While the window 204 will be described herein for convenience, embodiments of the present disclosure may be utilized with any fluid/tool interface having any shape or configuration. Also, a flow tube may enter and exit the housing with its flow fluid passing between a pair of windows, which are used when performing optical analysis of that fluid.

Embodiments of the present disclosure are utilized with downhole optical fluid analysis. As a result, the optical analysis tool 200 includes an analysis light source 208, a cleaning light source 210, and supporting electronics 212, which may include a detector, a memory, a processor, a communication system, and the like. It should be appreciated that the illustrated embodiment includes separate light sources 208, 210 for analysis and cleaning, however, in other embodiments the light sources may be integrated. For example, the light sources may be integrated into a single component that is tunable to emit light having a variety of different wavelengths. Furthermore, the respective light sources 208, 210 may include a plurality of different light sources. As will be described herein, certain wavelengths may be readily absorbed by the fluid 2-6 and/or a film and not the window 204, thereby enabling the rapid cleanup of the interface to remove residual films.

The cleaning light source 210 may include a variety of different light sources. For example, infrared light emitting diodes (IREDs) are narrow-band light sources, but they dim considerably at elevated downhole temperatures, if they operate at all, so they may need to be cooled in downhole use. Traditional incandescent light sources are bright and they do not dim at wellbore temperatures because they already operate at 3000 K, which is far above wellbore temperatures. However, their radiation is spread broadly over many wavelengths as predicted by the blackbody radiation curve. As a result, for applications needing a narrow-band source, they are energy inefficient because most of their power is wasted in the form of emissions outside of the desired narrow band.

While these traditional sources may be utilized with embodiments of the present disclosure, in various embodiments, hyperbolic thermal emitters (HTEs) may be utilized, as described in "Macroscopically Aligned Carbon Nanotubes as a Refractory Platform for Hyperbolic Thermal Emitters," by Gao. et al. in ACS Photonics 2019, 6, 7, 1602-1602 (Mar. 14, 2019), which is hereby incorporated by reference in its entirety. The described HTEs can operate at approximately 700 C. Furthermore, these light sources do not follow the usual blackbody emission curve. Instead, HTEs concentrate light into a narrow band of wavelengths whose center wavelength is related to the geometry and spacing of its nanostructures, such as an array of parallel carbon nanotubes. Such an emitter can provide a high-operating-temperature, bright, narrow-band, infrared light source centered about a 3-micron wavelength, corresponding to an absorption peak of water in order to optically heat a thin layer of fluid (such as water), which is in contact with an optical window, in accordance with embodiments of the present disclosure. Moreover, it should be appreciated that HPEs could also be used downhole as high-operating-temperature, bright, infrared light sources for performing infrared spectroscopy for downhole fluid analysis (such as the analysis light source 208). Several such sources could be used, each at a different wavelength, corresponding to absorption peaks of oil or of water or of specific compounds in oil.

For embodiments that utilize optical fiber to transport light to the window, it may be advantageous to use ultraviolet optical fiber for transmitting ultraviolet and use infrared optical fibers (ZrF4, InF3, ZBLAN) or hollow optical fibers for transmitting 3 micron, or some other wavelength, of mid-infrared light. As noted, a variety of light sources may be utilized with embodiments of the present disclosure. By way of example only, embodiments may utilize ultraviolet LEDs, mercury flash lamps, xenon flash lamps, deuterium lamps, infrared LEDs, miniature filament infrared sources, or the like.

In operation, the fluid 206 flows along the optical analysis tool 200 and an interface 214 occurs at approximately a location where a beam of light emitted from the tool 200 interacts with the fluid 206 (e.g., past the window 204). In operation, interaction between the light and the fluid may be measured, for example, the fluid may reflect (for example off a mirror or the like) and the supporting electronics 214 may include a detector that enables analysis of the fluid. In this manner, downhole optical analysis may be performed. As noted above, as the fluid phase changes, residual fluid may form a film or coat the window 204. Subsequent measurements may then be skewed because the residual fluid from a different phase may alter the results, for example, by interacting with the light beams from the tool.

Figure 3:
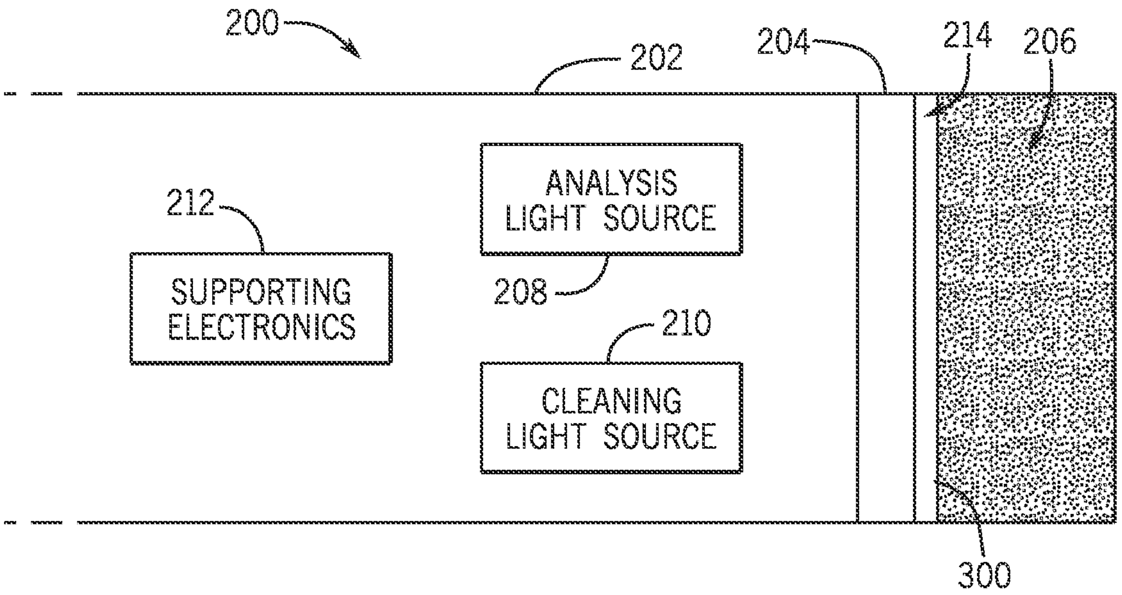
FIG. 3 is a schematic side view of an embodiment of an optical analysis tool, in accordance with embodiments of the present disclosure.

FIG. 3 is a schematic side view of an embodiment of the optical analysis tool 200 being utilized in wellbore operations. In this embodiment, the fluid 206, which as noted may be a hydrocarbon, water, gas, drilling mud, or the like, may coat or otherwise leave a residual film 300 along the window 204. For example, the film 300 may form at the interface 214 where the fluid 206 contacts the window 204.

In various embodiments, the film 300 may be from a phase that is different from a current phase of the fluid 206. For example, at a first time (such as the time shown in FIG. 2) a first phase of the fluid 206 may be oil (e.g., hydrocarbon). Over time, the hydrocarbon may build up on the window 204, thereby forming the film 300. As a result, at a second time (such as the time shown in FIG. 3) a second phase of the fluid 206 may be water. However, a beam emitted from the analysis light source 208 may still be interacting with the hydrocarbon forming the film 300, and as a result, information acquired by the optical analysis tool 200 may be incorrect. This may lead to erroneous data acquisition, which may directly hamper later downhole operations. Accordingly, systems and methods of the present disclosure rapidly clear the film 300 and may facilitate improved information for downhole recovery.

Figure 4:
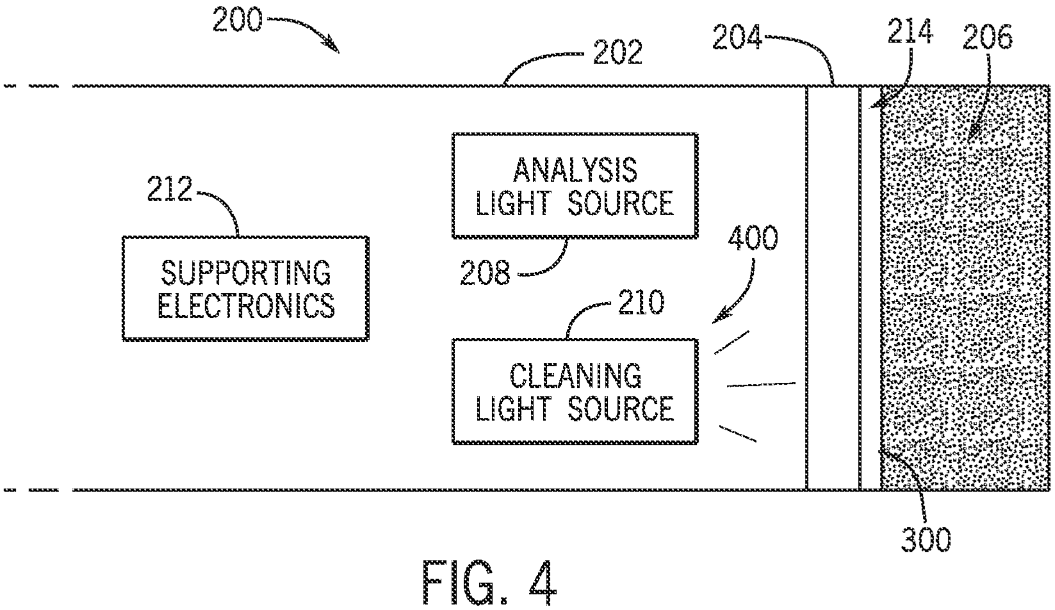
FIG. 4 is a schematic side view of an embodiment of an optical analysis tool, in accordance with embodiments of the present disclosure.

FIG. 4 is a schematic side view of an embodiment of the optical analysis tool 200. In the illustrated embodiment, the cleaning light source 210 emits a beam or flash 400 of light. In various embodiments, as noted above, this light may be concentrated into a narrow band of wavelengths and particularly selected for different types of fluids or expected fluids. The light 400 is emitted toward the window 204 and interacts with the film 300. In certain embodiments, the light 400 is emitted as a flash or rapid burst so that the emission is quick enough that heat is not conducted to the window, but preferentially absorbed by the film 300. This temperature absorption may raise the temperature of the film 300, which may reduce viscosity and/or increase mutual solubility to facilitate rapid clean up. As noted above, the wavelength of the beam 400 may be particularly selected for particular fluids and/or to avoid interaction with the window 204. Moreover, in certain embodiments, the volume of the film 300 is small, and as a result, only a small amount of light is utilized to sufficiently heat the film 300.

Figure 5:
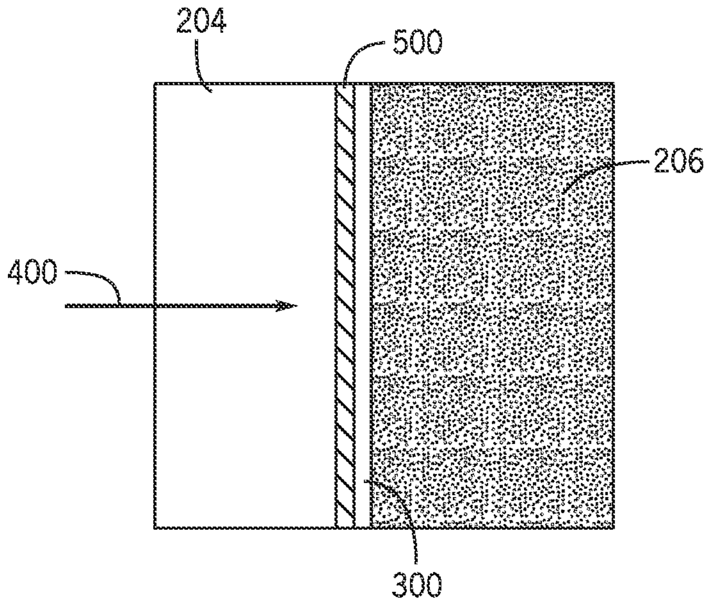
FIG. 5 is a partial detailed schematic view of an embodiment of an optical analysis tool illustrating a film at an interface, in accordance with embodiments of the present disclosure.

FIG. 5 is a schematic diagram illustrating heating of the film 300 that is arranged between the window 204 and the fluid 206. In various embodiments, light absorption of a fluid may be strong enough that light only penetrates a few wavelengths into the fluid. As a result, a heated volume 500 of the fluid is small, that is, less than a total volume of the fluid. Accordingly, a flash of the light 400 may be sufficient to raise the temperature of this heated volume 500 before the absorbed heat is conducted or radiated away. The elevated heat, as noted above, may increase viscosity and/or mutual solubility to facilitate rapid clean up.

As described above, a fluid's absorbance at some wavelengths is 1 OD per micron, which means approximately 90% of the light energy at that wavelength will be absorbed within one micron. Equation 1 estimates temperature rise for a fluid. As a result, different wavelengths and fluids may be evaluated and tested to determine a range of wavelengths for the cleaning light source.

$$ODpm = \frac{\log_{10}\frac{1}{(1-F)}(\Delta T)(SpHt)(SurfArea)(100)}{(F)(E)(0.239006)} \quad \text{(Equation 1)}$$

With Equation 1, one can enter a desired ΔT for the fluid film when it is exposed to a flash of light and then calculate the required ODpm, where ODpm is Optical Density per micron, where F is fraction of incident light energy absorbed by this thin fluid film (which is 0.9 for 1 OD); where one micron is the assumed film thickness within which this fraction, F, of light is absorbed; where ΔT is the Celsius temperature increase in this thin fluid film before any heat has had a chance to be conducted or radiated away; where the constant, 0.239006, is number of calories in one Joule; where E is incident light energy in microJoules (same as microWatts-seconds); where SpHt is the specific heat of this fluid film; and where SurfArea is surface area of this fluid film in square centimeters. Alternatively, one can solve Equation 1 for ΔT and input a value for ODpm.

In embodiments, Equation 1 may be utilized to test and/or estimate different wavelengths for different fluids. A database of wavelengths may be generated and the optical analysis tool 200 may be controlled to emit light at different wavelengths to facilitate clearing of the window. For example, downhole analysis may be conducted and a phase may be determined, which may include information of the fluid. Based on this information, the wavelength for the cleaning light source may be selected and the light may be emitted periodically, or in response to a command, in order to clear the window.

Embodiments, as a result, lead to a non-contact optical method of heating the film 300 where the beam 400 is emitted and absorbed only by the film 300 without absorption, or with minimal heating, of the window 204. Advantageously, when compared to other methods that directly heat the window or a solid coating that covers the window, less heat is needed because only the thin fluid film, itself, is heated, which lowers its viscosity and increases its solubility making it easier for this fluid film to be flushed away by subsequent fluid passage. Moreover, a simplified configuration is enabled because additional heating coils and the like are not included within the optical analysis tool 200.

Figure 6:
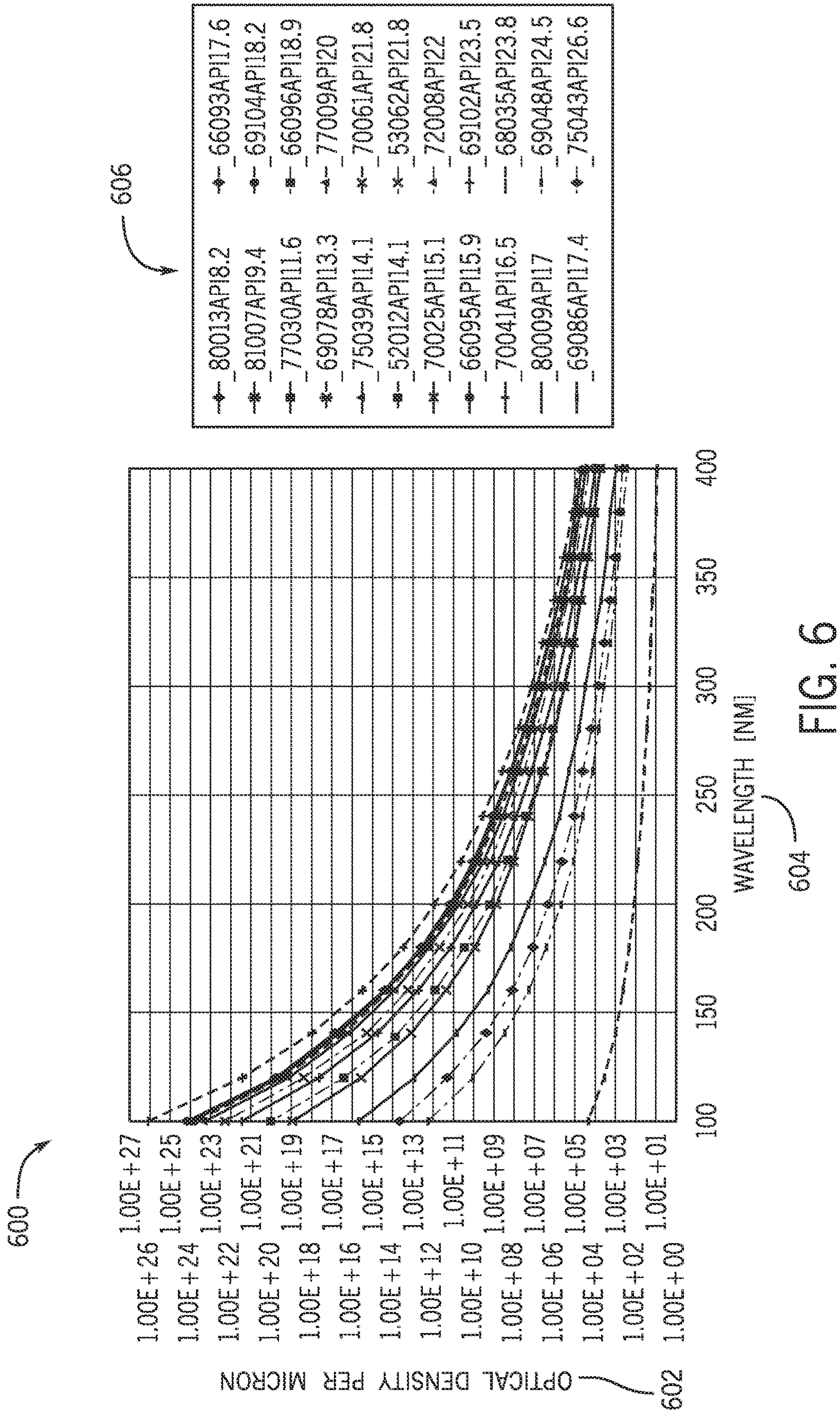
FIG. 6 is a graphical representation of an embodiment of optical densities for heavier, denser, and more viscous hydrocarbons in the API range of 8.2 to 26.2, in accordance with embodiments of the present disclosure.
Figure 7:
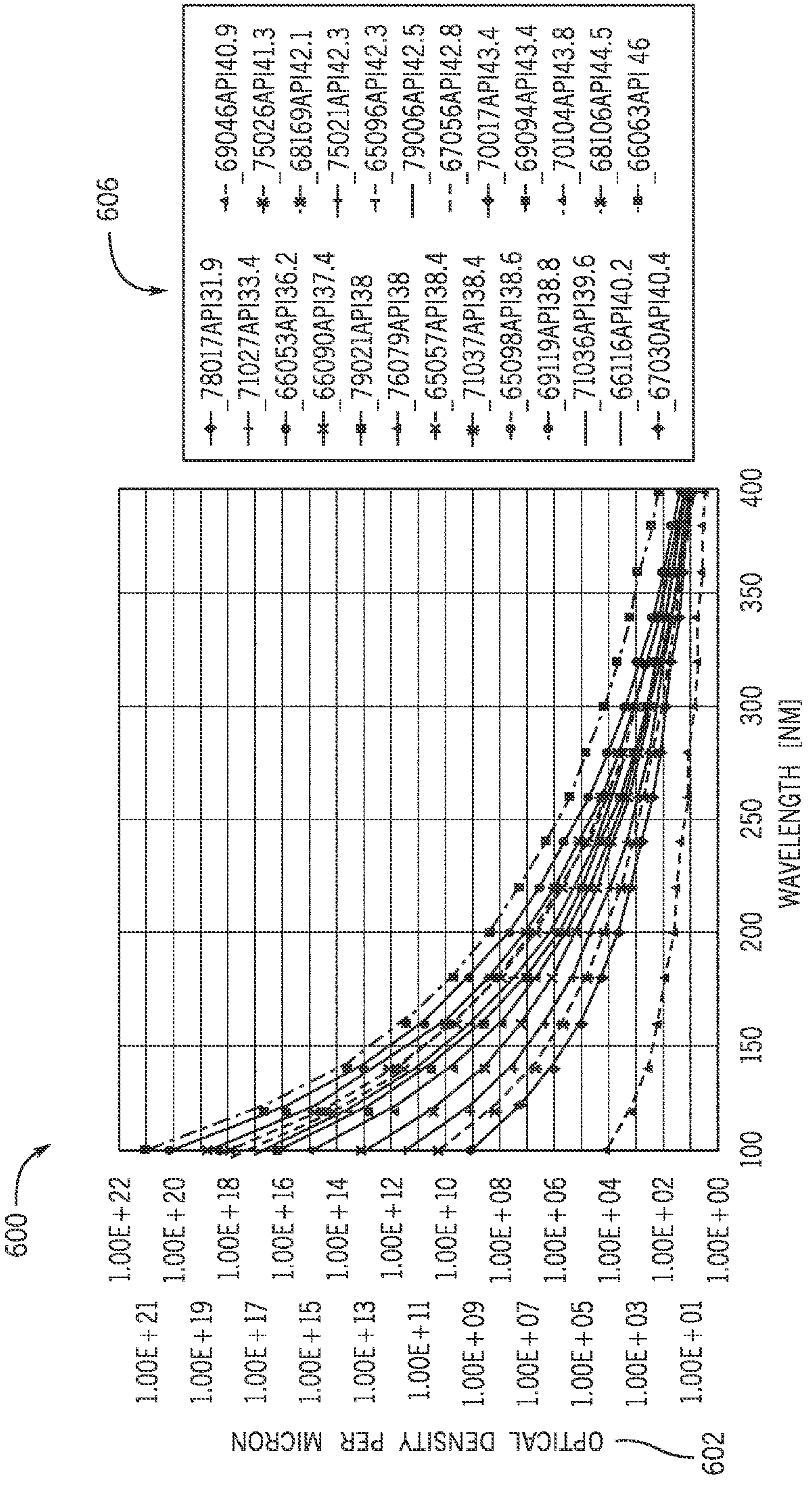
FIG. 7 is a graphical representation of an embodiment of optical densities for medium density and viscosity hydrocarbons in the API range of 31.9 to 46, in accordance with embodiments of the present disclosure.
Figure 8:
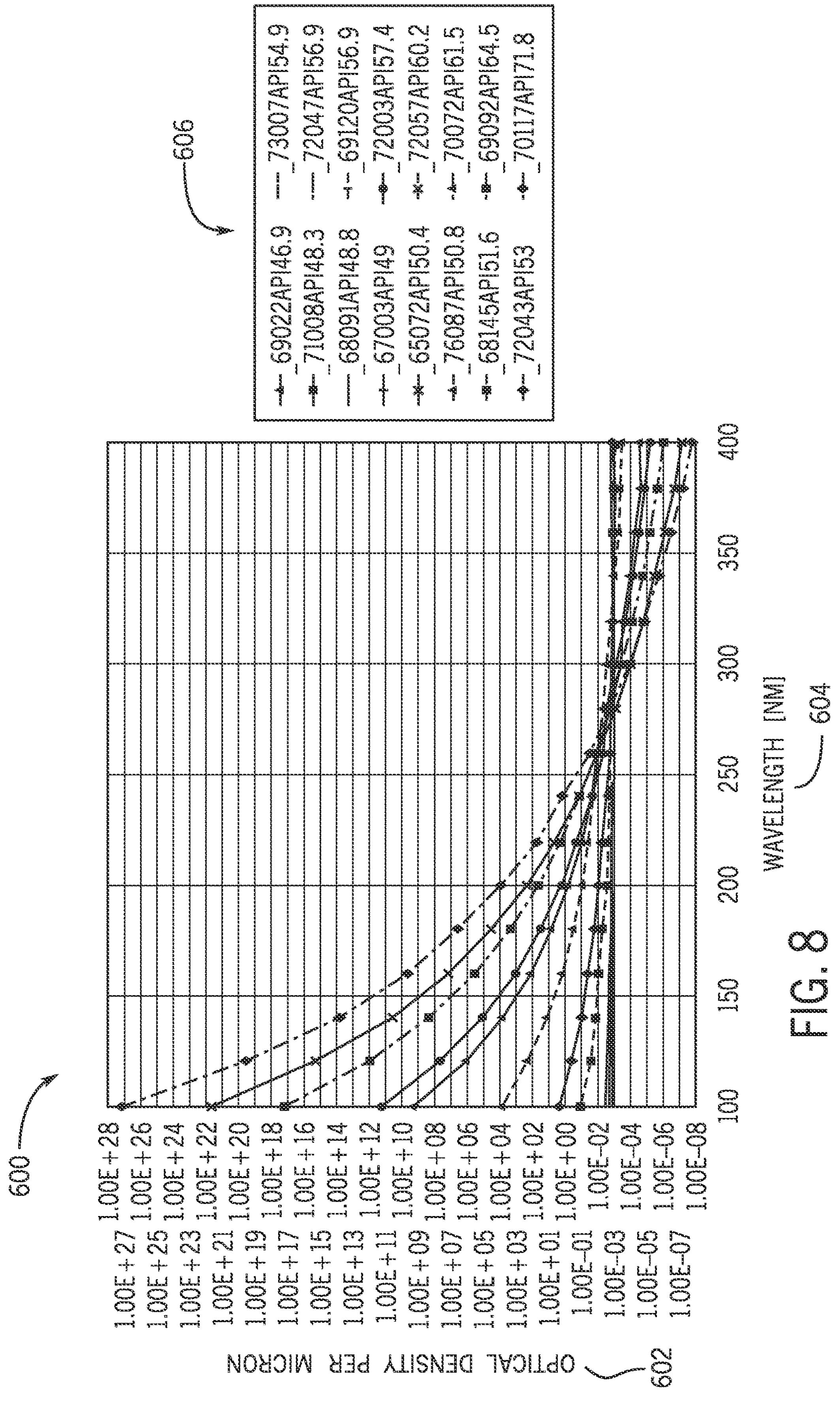
FIG. 8 is a graphical representation of an embodiment of optical densities for lighter, lower density and viscosity hydrocarbons in the API range of 46.9 to 71.8, in accordance with embodiments of the present disclosure.

Embodiments of the present disclosure may be utilized to estimate optical densities for a variety of crude oils. FIGS. 6-8 illustrate graphical plots of optical densities for different wavelengths for a group of crude oils. In each of the plots 600, a y-axis 602 corresponds to ODpm and an X-axis 604 corresponds to wavelength (nm). As illustrated, optical density for a collection 606 of heavy crude oils (FIG. 6) decreases as wavelength increases. Similar relationships with ODpm and the wavelength are also illustrated with medium crude oils (FIG. 7) and light crude oils (FIG. 8). As shown, for all but extremely light crude oils, the absorbance at most ultraviolet wavelengths far exceeds 1 OD per micron. Accordingly, the ultraviolet region is acceptable for rapid heating of crude oil and embodiments may be directed to utilizing cleaning light sources 210 having shorter wavelengths (e.g., within the ultraviolet region).

Figure 9:
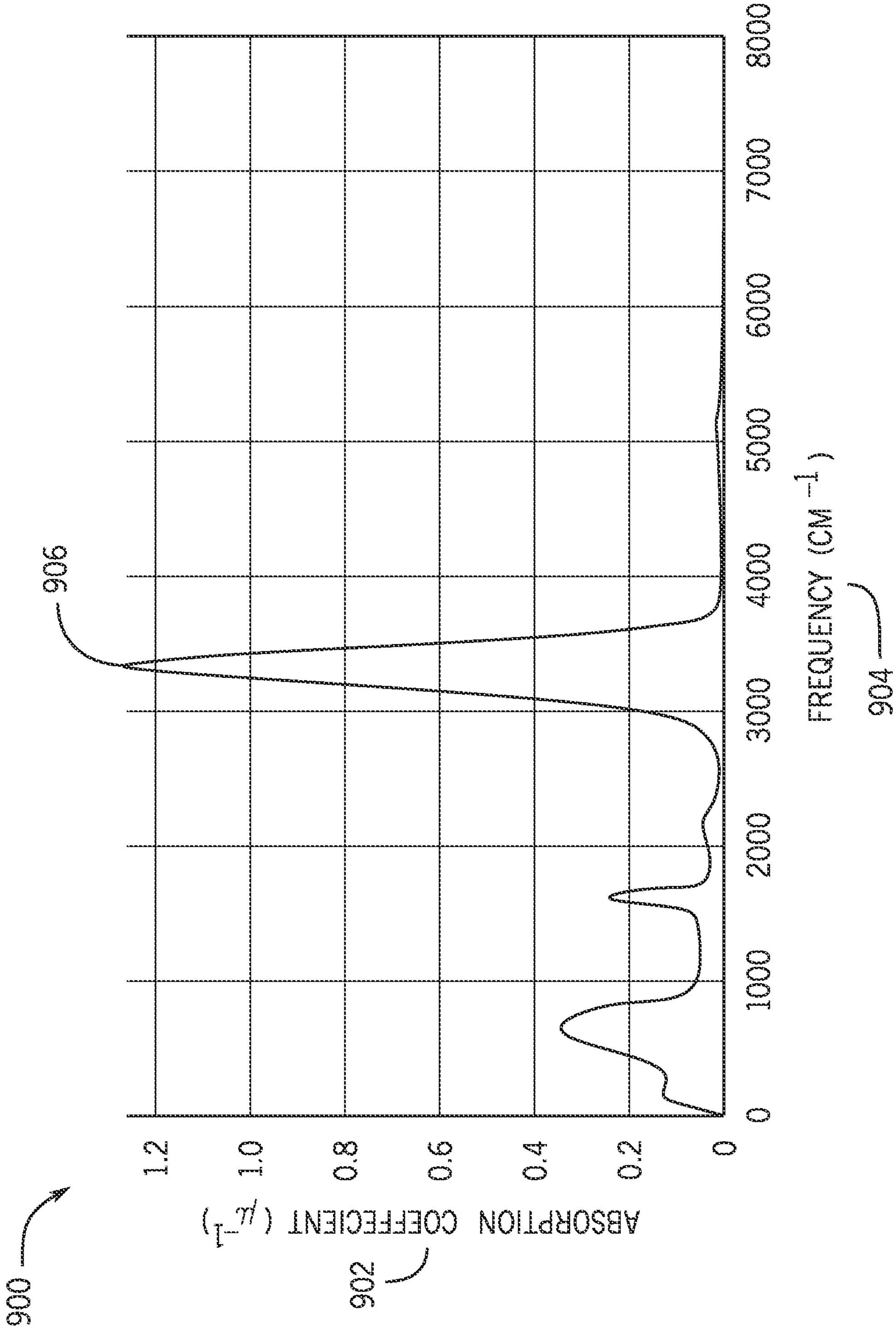
FIG. 9 is a graphical representation of infrared absorbance in pure water, in accordance with embodiments of the present disclosure.

Another fluid that may be encountered in the downhole environment is water. Quickenden & Irwin 1980 have demonstrated that water is a poor absorber of ultraviolet radiation. For example, water has an absorbance of less than 1 millionth of an OD per micron at wavelengths between 200 and 350 nm. However, water strongly (1.3 OD per micron) absorbs infrared light at approximately 2898 nm. For example, FIG. 9 illustrates a graphical plot for infrared absorbance of pure liquid water. In the illustrated embodiment, a plot 900 represents an absorption coefficient against frequency. The y-axis 902 corresponds to the absorbance per micron (OD/μ) and the x-axis 904 corresponds to the spatial frequency ($cm^{-1}$), which can be converted to units of wavelength, in nanometers, by dividing that spatial frequency into 10 million nm/cm. In the illustrated embodiment, it is shown that the absorption coefficient is low, often less than 0.2, over a wide range of frequencies. However, a distinct peak 906 is illustrated at approximately 3450 $cm^{-1}$, (corresponding to 2898 nm), identifying a desirable spatial frequency for absorption when evaluating water. Accordingly, a light source that can be tuned to the appropriate spatial frequency may be utilized for rapid heating of water.

Figure 10:
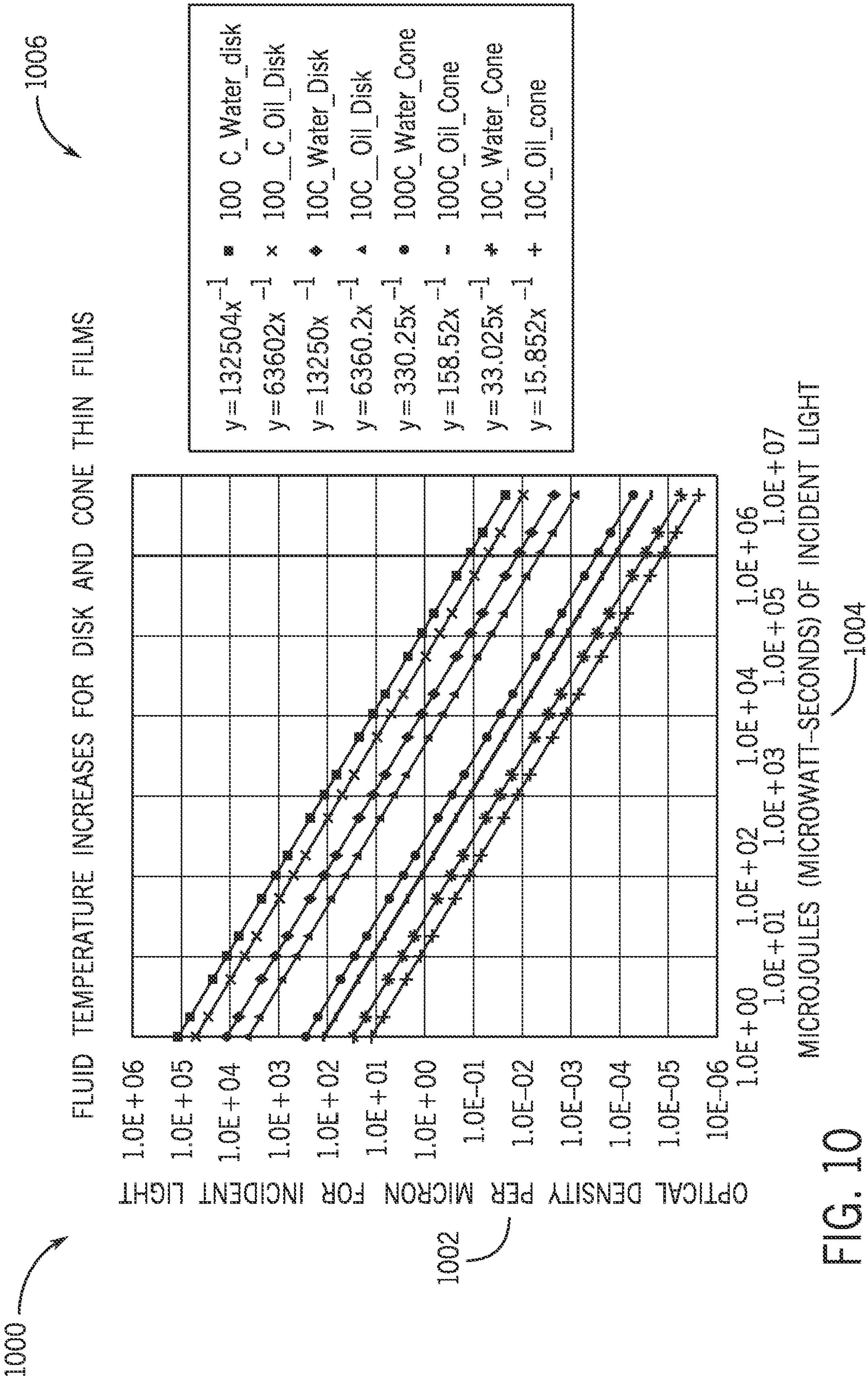
FIG. 10 is a graphical representation of fluid layer temperature increases, in accordance with Equation 1 and the embodiments of the present disclosure.

FIG. 10 illustrates a graphical plot 1000 representative of Equation 1. In the illustrated plot 1000, the y-axis 1002 corresponds to the optical density per micron, ODpm, and the x-axis 1004 corresponds to incident light energy in micro-Joules. From this family of straight line plots on a log-log scale, one can immediately see how many microwatt-seconds of optical energy are needed for a particular fluid's optical density per micron to achieve either a 10 C or a 100 C temperature rise of a thin fluid film of water or of oil for either the disk-shaped window or the cone-shaped tip configurations described earlier. As illustrated, as ODpm decreases, more light energy is required to increase the fluid temperature. Accordingly, fluids with larger ODpm may be heated faster, by a relatively short flash of light, whereas other fluids with smaller ODpm will not be as easily heated.

Figure 11:
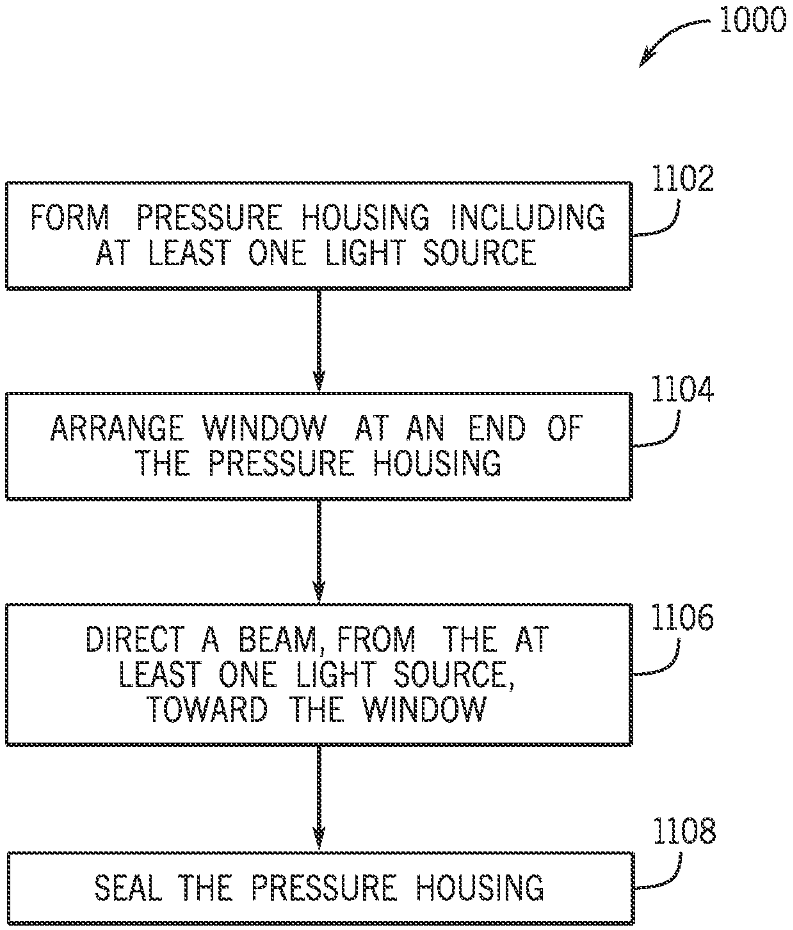
FIG. 11 is a flow chart of an embodiment of a method for forming an optical analysis tool, in accordance with embodiments of the present disclosure.

FIG. 11 is a flow chart of an embodiment of a method 1100 for forming a downhole tool that may utilize embodiments of the present disclosure. It should be appreciated that for this methods, and all methods described herein, that there may be more or fewer steps and that the steps may be performed in a different order, or in parallel, unless otherwise specifically stated. This example begins with forming a pressure housing that includes at least one light source 1102. As noted above, the pressure housing may accommodate the pressures and temperatures associated with a downhole environment. In various embodiments, the pressure housing may be filled with air or an inert material and may be maintained at a predetermined pressure and/or temperature. A window is arranged at an end of the pressure housing 1104. The window may be transparent or semi-transparent to facilitate optical analysis of the passing fluid. A beam, from the at least one light source, is directed toward the window 1106. For example, the beam may be aligned with at least a portion of the window. Thereafter, the housing is sealed 1108. In this manner, a downhole tool may be formed.

Figure 12:
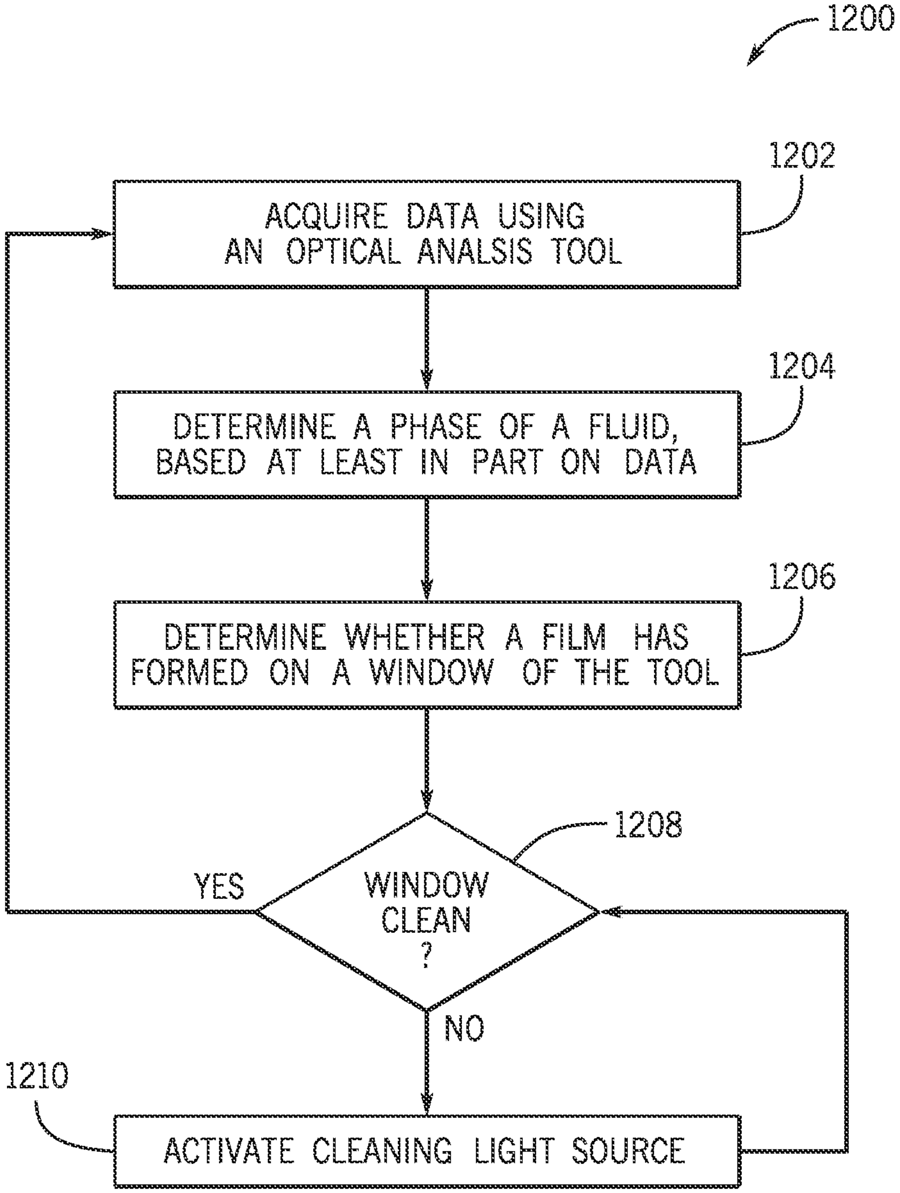
FIG. 12 is a flow chart of an embodiment of a method for performing data acquisition with an optical analysis tool, in accordance with embodiments of the present disclosure.

FIG. 12 is a flow chart of an embodiment of a method 1200 for utilizing an optical window cleaning light source, as described herein. This example includes acquiring data using an optical analysis tool 1202. For example, the tool may form a portion of a production or drill string that acquires information from downhole fluids. In various embodiments, the tool may include a window that enables interaction with a light source associated with the tool. The example also includes determining a phase of a fluid 1204. For example, the tool may be utilized to determine the fluid is hydrocarbon. It should be appreciated that the determination may be made in real or near-real time and/or at a later time, for example, based on an analysis of recorded data. In various embodiments, a determination is made to detect whether an adherent film has formed on the window 1206. For example, data may be analyzed to evaluate for irregularities. Moreover, the determination may include evaluating whether a threshold period of time has elapsed. The window's status is evaluated 1208, and, if the window surface is clean, then data acquisition continues. It should be appreciated that whether or not the window is clean may be determined based on particularly selected parameters, such as subsequent readings from a sensor and/or the like. Accordingly, in various embodiments, a window being clean correspond to transmission of a threshold quantity of light through the window, among other options. If not, then a cleaning light source is activated 1210. In various embodiments, the cleaning light source may include a beam of light at a particularly selected threshold that heats at least a portion of the fluid to facilitate cleaning of the window. In this manner, data acquisition may continue with a clean window, thereby improving data collection.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for determining one or more fluid properties, comprising:
- a tool component adapted to be secured to a tool string for use in a downhole environment; and
- a sensor associated with the tool component, comprising:
  - a pressure housing having a chamber;
  - a window at an end of the pressure housing;
  - at least one light source arranged within the chamber, the at least one light source adapted to emit a light beam at a wavelength corresponding to an optical density per micron greater than one for at least one wellbore fluid.

2. The system of claim 1, wherein the wavelength is selected, at least in part, on a property of the at least one wellbore fluid.

3. The system of claim 1, further comprising a second light source, the second light source emitting light for performing downhole measurements, the second light source being different from the at least one light source.

4. The system of claim 1, wherein the window is at least one of a disk-shaped window or a conical tip.

5. The system of claim 1, wherein the at least one light source is formed by at least one of hyperbolic thermal emitters, ultraviolet light emitting diodes (LEDs), mercury flash lamps, xenon flash lamps, deuterium lamps, infrared LEDs, miniature filament infrared sources, or a combination thereof.

6. The system of claim 1, wherein the at least one light source comprises a plurality of emitters, each emitter of the plurality of emitters configured to emit light at a different wavelength.

7. The system of claim 6, wherein at least one emitter of the plurality of emitters is configured to emit infrared light and at least one emitter of the plurality of emitters is configured to emit ultraviolet light.

8. The system of claim 6, wherein at least one emitter of the plurality of emitters is configured to emit light having a wavelength between approximately 100 nm and 250 nm.

9. The system of claim 6, wherein at least one emitter of the plurality of emitters is configured to emit light having a wavelength of approximately 2898 nm.

* * * * *